INVENTORS
REX G. FINNEY
ALBERT J. SIDEBOTTOM
BY
ATTORNEYS

Feb. 24, 1970   R. G. FINNEY ET AL   3,497,168
APPARATUS FOR COUPLING AND DECOUPLING A LOAD
Filed June 5, 1968   2 Sheets-Sheet 2

INVENTORS
REX G. FINNEY
BY ALBERT J. SIDEBOTTOM

ATTORNEYS

United States Patent Office 3,497,168
Patented Feb. 24, 1970

3,497,168
APPARATUS FOR COUPLING AND
DECOUPLING A LOAD
Rex G. Finney, El Centro, and Albert J. Sidebottom,
Seeley, Calif., assignors to the United States of
America as represented by the Secretary of the
Navy
Filed June 5, 1968, Ser. No. 734,692
Int. Cl. B64d *17/38*
U.S. Cl. 244—149                                    7 Claims

ABSTRACT OF THE DISCLOSURE

The coupling-decoupling mechanism is provided by a pair of rectilinear links each secured to a strap, the straps, in turn, being secured one to a load and the other to a drogue parachute. An endless cord binds the two links together and a reefing line cutter is employed to sever the cord to decouple the load from the drogue. In particular, the links are placed one adjacent to the other and the cord looped or wound about the outer sides of the adjacent legs of the link. Centrally of these loops, the cord is formed into an elongate, longitudinally-extending loop which encircles a ring connector secured, preferably, to the load-connected strap. The reefing line cutter is carried by the other strap and has an end projecting into the space defined by the legs of the link of this particular strap. The ends of the loops which encircle the adjacent legs of the links are passed around the sides of the link which carries the cutter member and then through a transverse opening of the cutter. The cutter severs the portion of the cord passing through the transverse opening to effect the decoupling.

The invention described herein may be manufactured and used by or for the Government of the United States of America for governmental purposes without the payment of any royalties thereon or therefor.

BACKGROUND OF THE INVENTION

The present invention relates to couplings and, in particular, to couplings capable of automatically decoupling at a predetermined instant.

Apparatus of the type presently contemplated is used to couple a load to a drogue parachute and, during the initial portion of the drop of the load from an aircraft, to automatically disconnect the load from the drogue. Customarily, the load then is transferred to the primary or main parachute of the system which permits the desired gentle landing. The principles of the prevent invention of course, may be used to advantage in many other applications.

Drogue parachutes are used to impose a limited degree of retarding force upon a falling object to absorb part of the force that otherwise would be applied abruptly to the main canopy of the system and also, to permit a faster initial drop. After accomplishing these purposes, the drogue is decoupled from the load and, as would be expected, a variety of disconnect and load transfer devices have been employed. However, such devices mostly are mechanical in nature and relatively bulky, heavy, and difficult to package. Also, the mechanical devices are of a type activated either by load relaxation or by the use of time delay mechanisms which may open a metal latch. Further, the prior devices appear unnecessarily complex and the relatively heavy mechanisms create supply and maintainance problems unfamiliar to specialists in parachute work.

THE OBJECTS OF THE INVENTION

One of the general objects of the present invention is to provide a coupling for securing together a pair of members of any type, the coupling being capable of being severed by a conventional reefing line cutter of the type commonly employed in parachute applications to sever woven cords or lines such as the load suspension lines of the parachute itself.

A more specific object is to provide a cord-type coupling apparatus utilizing materials and parts entirely compatable with parachute systems.

Another object is to provide cord-type coupler capable of automatically decoupling during a parachute drop and of simultaneously accomplishing a transfer of the load to another line.

Still another object is to provide a cord-type coupler and decoupler arranged to be severed by a reefing line cutter, the arrangement being such that the coupling arrangement exerts little or no pressure on the cutter when tension is applied to the coupling.

A further object is to provide a cord-type coupling capable of being severed to achieve the decoupling of a pair of members, the decoupling being achieved in a smooth, even manner.

Other objects and features of the invention will become more apparent in the detailed description which is to follow.

SUMMARY OF THE INVENTION

Broadly considered, the apparatus for coupling and decoupling a pair of members utilizes a pair of U-shaped links coupled one to each of the members, the links, most suitably, being rectilinear in shape and coupled to the members by a strap. Each link is formed with a straight web portion and the web portions are disposed one adjacent the other. A ring-like connector is carried by one of the members and a cord cutter, such as a conventional reefing-line cutter, carried by the other. The cutter has an end portion projecting into the space between the legs of the link which is secured to the cutter carrying member and this end portion is provided with a transverse opening through which the cord of the present coupling is threaded so as to be in position to be severed. The cord is an endless loop wound in a particular manner around the links and through the ring-like connector. More specifically, the cord is looped around each side portion of the adjacent webs of the links, and, centrally of these web encircling loops, the cord is wound in another elongate loop through the ring connector. The ends of the web-encircling loop also encircle the legs of the link which is carried by the cutter carrying member and then are joined by being run in a substantially straight extent through the transverse opening of the cutter itself. Most suitably, the central loop which is run through the ring-like connector is disposed immediately adjacent to the portion of the cord which is threaded through the cutter so that, as will become more apparent, tension exerted on the central loop is not applied to the portion of the cord extending through the cutter. As will be appreciated, it is not desirable to have tension between the members applied to the cutter since, if it were, the cutter might be actuated inadvertently.

For special applications, such as the coupling of a load to both a drogue chute and a primary or main chute, the arrangement is such that the initial tension or support of the load is provided exclusively by the links coupling the load to the drogue chute. However, the load is also secured by a special and independent line coupled to the primary or main parachute. Also this independent line is of sufficient length so that it is not initially in tension when the load is supported by the drogue parachute. Upon severing of the cord by the reefing line cutter, the support initially provided by the drogue is relieved and the weight of the load transferred to the independent line coupled to the parachute. Preferably, the main parachute is contained in a bag which, in turn, may be secured to the drogue parachute so that, when the links are freed and the drogue parachute released, it tends to pull the bag away from the main or primary parachute.

BRIEF DESCRIPTION OF THE DRAWINGS

The preferred embodiment of the invention as illustrated in the accompanying drawings of which.

DESCRIPTION OF THE PREFERRED EMBODIMENT

Figure 1:
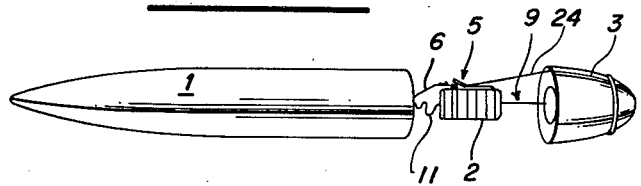
FIGS. 1, 2, 3, and 4 are somewhat schematic views illustrating progressively the various operations occuring during the drop from an aircraft of a load supported first by a drogue parachute and then by a main parachute.

In FIG. 1 the various components are shown in the positions normally occuring immediately following release of the parachute system and its load from a traveling aircraft. The principal components shown in FIG. 1 include a load casing 1, a main parachute bag 2 and a wing pad 3 in which the main parachute bag, as well as a drogue parachute 4 (FIG. 2), initially are contained prior to release from the aircraft.

The coupling of the present invention, generally indicated by numeral 5, has one of its sides secured by a strap or line 6 to a load 15 (FIG. 3) originally housed within load casing 1 and its other side coupled by a line or strap 9 to the drogue parachute. In addition, main parachute bag 2 also is secured to the load by an independent line 11 which, as shown in FIG. 1, is of sufficient length to be loose or relaxed until such time as the drogue is decoupled. In FIG. 1 the weight of load casing 1 has pulled parachute bag 2 from the wing pad and also the tension in lines 6 and 9 is exerting tension on the drogue parachute to pull it from pad 3.

Figure 2:
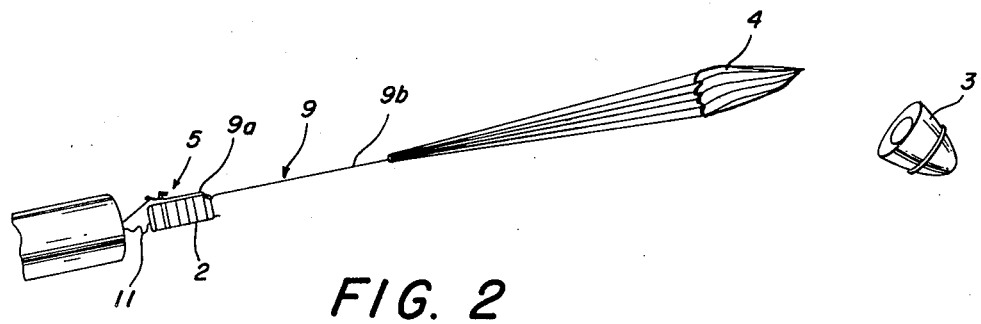

In FIG. 2, drogue parachute 4 has been pulled from the wing pad and the load is starting into its falling trajectory during which it will be supported by the drogue which exerts its retarding force directly upon lines 6 and 9 as well as coupling 5.

Figure 3:
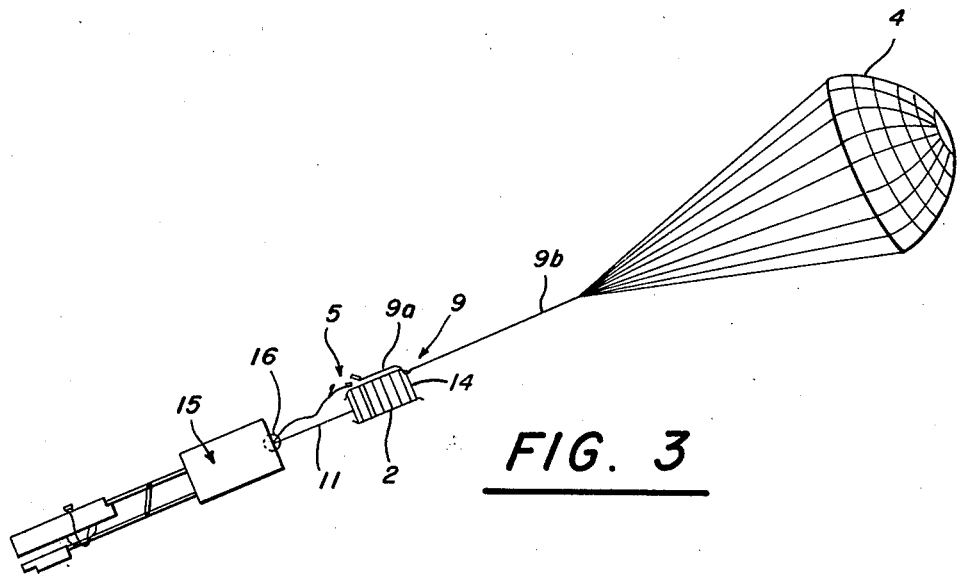
Figure 4:
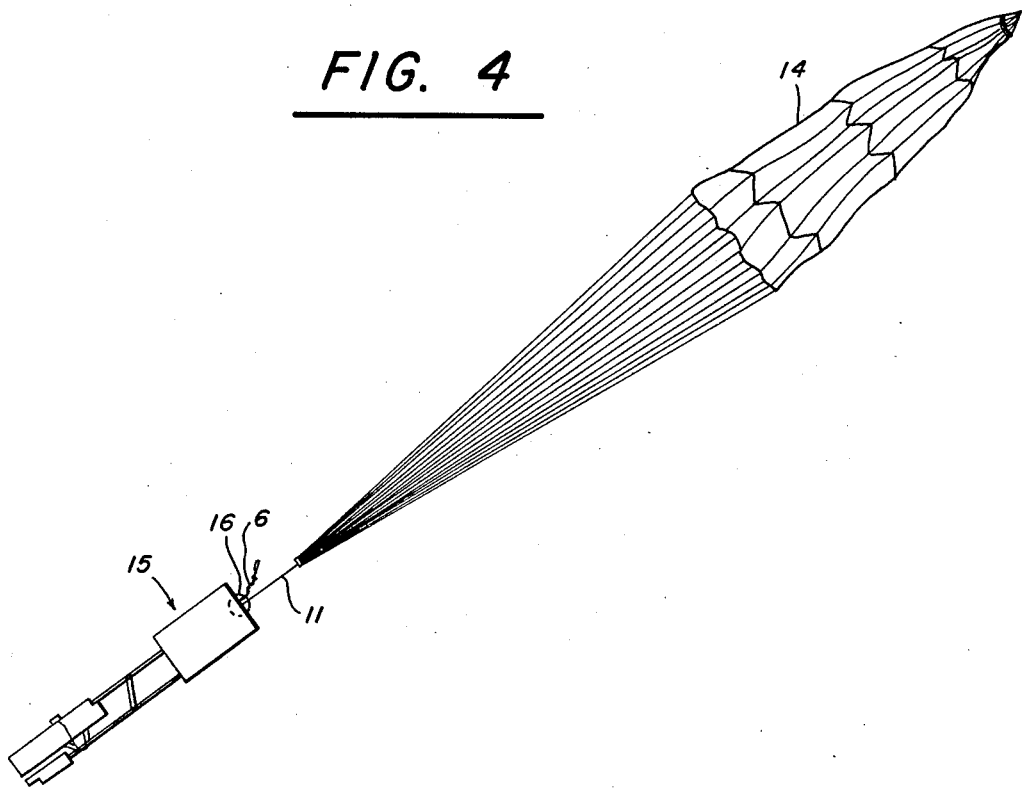
Figure 5:
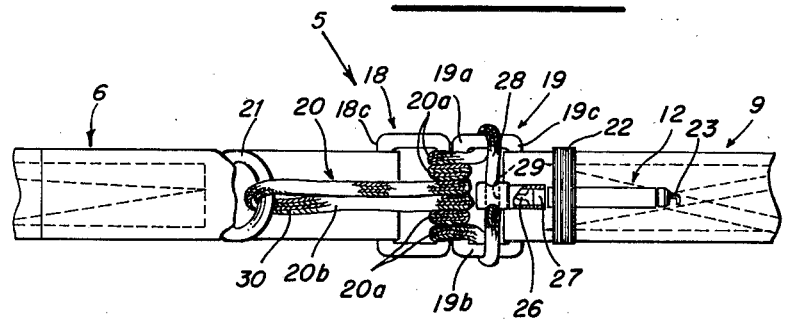
FIG. 5 is an enlarged fragmentary view showing the particular coupling of the present invention.

In FIG. 3, a reefing line cutter 12 which is shown in FIG. 5 and will be described with reference thereto, has severed coupling 5 to relieve tension on lines 6 and 9a and to transfer the tension to independent line 11 which, as stated, normally loosely extends between the load and the bag 2 of the main parachute. The tension on independent line 11 then pulls a main parachute 14 (FIG. 4) from its bag 2, although the freeing of the main parachute also is assisted by the drogue parachute which is secured to the main parachute bag in such a manner as to exert a pull on the bag. The details of these operations will be clarified in subsequent description.

The remainder of the descent is under the control of main parachute canopy 14 (FIG. 4) and, of course, this canopy has sufficient retarding force to permit the requisite gentle landing of the load.

It also may be noted from an inspection of FIGS. 1–4 that the particular load for the special application to which this description relates is a sonar buoy indicated by numeral 15 (FIGS. 3 and 4), this load initially being contained in casing load 1. In practice, a special load release mechanism 16 (FIG. 3) is employed to allow casing 1 to fall free of the load.

The principal features of the present invention are more directly concerned with coupling 5 and the special manner in which it is achieved. Coupling 5 is shown in detail in FIG. 5 where first it will be noted that connecting lines 6 and 9 which are secured one to each side of the coupling preferably are in the form of a heavy webbing or strap. Webbing or strap 6 is secured in any appropriate manner to the sonar buoy or load 15. In like manner, the other webbing or strap 9 has one of its ends secured to drogue parachute 4 and, in addition, this strap also is secured to parachute bag 2 as indicated in FIGS. 2 and 3. In actual practice it may be preferred to form webbing 9a and 9b the latter being the conventional load suspension line of the drogue parachute and line 9a being a webbing or strap member.

Referring again to FIG. 5, webbings 6 and 9 are secured one to the other by special rectangular-shaped links 18 and 19, the links being bound in a special manner one to the other by an endless cord 20 which, most suitably, is a coreless braided line, the strength of which may be varied to suit conditions of use. The arrangement further includes previously identified reefing line cutter 12 and a ring connector 21 which may be a D-ring having its straight extent engaged by a webbing loop. Reefing cutter 12 is secured to drogue webbing 9 in any manner such as by a binding 22. The cutter is a conventional commercially-obtainable reefing line cutter customarily including such elements as a firing pin 23 held in a retracted position by a spring other suitable member (not shown), the pin, in turn, being coupled to lanyard 24 (FIG. 1), which, when pulled, causes this spring to release the firing pin which then strikes a primer cap or the like to initiate a cutting operation. Obviously, the reefing line cutters also must include a knife edge 26 usually mounted on a piston 27 explosively driven at high velocity to sever the reefing line which, in the present application, is a section of endless cord 20. It also is conventional as well as desirable for present purposes to employ some time delay mechanism between the release of the firing pin and the actuation of the exposive charge. For example, in the operation illustrated in FIGS. 1–4, it is desirable to utilize a time delay of about six seconds, this delay permitting the drogue parachute to exert its initial retarding force prior to the takeover by the main parachute. A powder train delay assembly or similar mechanism may be employed to produce the desired delay interval. Since these reefing line cutters are well known structural details are not fully shown although, if desired, exemplary details are available in a number of publications, such, for example, as U.S. Patent 2,755,550 issued in 1956 to J. P. Benjamin.

The manner in which endless cord 20 binds together links 18 and 19 is of particular significance. Referring to FIG. 5, it first will be noted that the cord winding includes substantially straight extent 28 running transversely of connector link 19, this straight extent being threaded or run through a transverse opening 29 being formed in an end portion of cutter 12 which projects into the space defined by the sides or legs 19a and 19b of this link. For descriptive purposes each link may be considered as being formed of the previously-identified legs and of straight web portions 18c and 19c which, of course, unite the legs to form the rectilinear links. The ends of transverse extent 28 of the cord each are looped over and under their adjacent legs and each then are formed into a plurality of loops 20a encircling web portions 18c and 19c to bind these webs tightly together. The ends of web encircling loops 20a are formed into an elongate loop 20b that engages D-ring 21. Obviously, loop 20b initially must be formed of a length of line in the described manner and then spliced at its free ends so as to be endless. Most suitably, the ends are united in a splice 30 and additional strength can be achieved by utilizing what is commonly known as a Chinese finger splice. In other words, one end of the cord is inserted into the hollow space in the other end of the cord, it previously being noted that the cord is a coreless member. The two ends of the splice then are tightly stitched together by a zig zag stitching or the like.

In the illustrated embodiment, the coupling employs two loops 20a on each side of elongate loop 20b. However, any number of loops may be employed to increase the strength. It also is to be noted that elongate loop 20b is formed centrally of side loops 20a and that the elongate loop is disposed so as to extend longitudinally adjacent to the reefing line cutter. This arrangement relieves tension on transverse extent 28 to eliminate any undesirable pull on the reefing line cutter. Tension between webbings 6 and 9 is absorbed almost completely by loops 20a and 20b.

When trigger mechanism 23 of the reefing line cutter is pulled, knife edge 26 severs the portion of transverse extent 28 to permit the links to separate. Here again the particular winding of the cord about the webs is of some significance since, as will be readily understood, each severed end should unwind evenly due to the symmetry of the loops.

In the particular drogue chute application being described it is apparent from FIG. 3 that, upon a parting of links 18 and 19, the force exerted by the load is transferred from the link connection to line 11 which, as already pointed out, is connected between load 15 and parachute 14. The force exerted by the load tends to pull the main parachute canopy from bag 2, although, as also stated, the retarding force of the drogue parachute assists in freeing the main canopy since it is coupled to the parachute bag.

The operation of the coupling arrangement provided by the present invention has been described and should be quite obvious. Briefly restated, however, reefing cutter line 12 is activated by a pull on lanyard 24 and, after a predetermined time interval, the cutter severs endless cord 20 to permit the windings of the cord to release in a smooth and even manner. In the drogue chute utilization shown in FIGS. 1–4, the lanyard may be coupled to wing pad 3 which contains the drogue parachute. Upon release from the aircraft the tension between lines 6 and 9 pull the drogue parachute from its wing pad and permit the initial drop to be under its control. After sufficient retarding force has been exerted by the drogue parachute, the severing of the coupling permits transfer of the load to the main parachute.

Some of the principal advantages lie in the relatively low cost of the coupling combined with its simplicity and particularly with its use of materials and components conventionally employed in parachute systems, such elements being the endless cord, the links, the webbings and the reefing line cutter. At the same time, the manner in which the endless cord binds the links to produce a strong, reliable coupling and the strength can be made proportionate to the number of loops formed on the links. The coupling is particularly advantageous for drops utilizing a drogue combined with a main parachute particularly since the manner in which the coupling releases permits a smooth transfer of the load from the drogue parachute to the main canopy. Also, the arrangement provides a positive force to pull the drogue parachute from its canopy as well as the force that assures release of the main canopy from its container.

Obviously many modifications and variations of the present invention are possible in the light of the above teachings. It is therefore to be understood that the invention may be practiced otherwise than as specifically described.

What is claimed is:

1. Apparatus for coupling and decoupling first and second members comprising:
   a pair of U-shaped links coupled one to one of said members and the other to the other,
   said links each being formed with leg portions and with a substantially straight web portion and said web portions being disposed one adjacent and substantially parallel to the other,
   a ring-like connector carried by one of said members and a cord cutter carried by the other of said members,
   said cutter having an end portion projecting into the space defined by the leg portions of the link of said cutter-carrying member and said projecting end portion being provided with a transverse opening, and
   an endless cord looped around said adjacent web portions of the links and around said ring-like connector,
   the loops for said web being disposed on each side portion of the webs and the loop for said connector being formed centrally of said web loops,
   the ends of said web-encircling loops encircling the legs of the link carried by said cutter-carrying member and also being formed with a substantially straight extent running transversely between said encircled legs and through said transverse opening of said cutter,
   said cord cutter including driven means operable to sever the portion of said cord disposed in said transverse opening to free said links and decouple said members, and
   said arrangement permitting tension between said members to be absorbed principally by said cord loops whereby the portion of the cord to be severed is relatively tension-free.

2. The apparatus of claim 1 further including a third member, and
   a line independently coupling said third member to one of the other members,
   said line being of sufficient length to be tension-free when tension is exerted between said pair of members whereby when said pair of members are decoupled said line maintains its coupling to said third member for absorbing tension exerted between the third member and the member to which it is coupled.

3. The apparatus of claim 2 wherein said cord-cutter further includes:
   triggering means for said driven means,
   a lanyard coupling said triggering means to the cutter-carrying member and operable when tension is exerted between said members to activate said triggering means, and
   means for operating said driven means at a predetermined interval of time after said actuation of said triggering means.

4. The apparatus of claim 3 wherein said first member is a secondary drogue parachute, said second member a parachute load, said third member a primary main parachute, and said independent line couples said third member to said parachute load, said means for coupling said first member to its U-shaped link being a strap and said cord cutter being carried by said strap.

5. The apparatus of claim 4 further including:
   container means for said primary main parachute, and
   means coupling said strap to said container means whereby decoupling of said secondary drogue parachute tends to separate the container from its contents.

6. The apparatus of claim 4 wherein said endless cord includes plural loops of equal number encircling said web portions of the links on each side of said centrally-disposed connector loop.

7. The apparatus of claim 6 wherein said projecting end of said cutter bisects said straight extent of said cord and said central connector loop of said cord is disposed laterally adjacent to said projecting end.

References Cited

UNITED STATES PATENTS

| 2,581,645 | 1/1952 | Frieder | 244—149 |
| 2,755,550 | 7/1956 | Benjamin | 30—180 |

MILTON BUCHLER, Primary Examiner

T. W. BUCKMAN, Assistant Examiner

U.S. Cl. X.R.

24—205.17; 30—180